US006480831B1

United States Patent
Cordery et al.

(10) Patent No.: US 6,480,831 B1
(45) Date of Patent: Nov. 12, 2002

(54) METHOD AND APPARATUS FOR SECURELY TRANSMITTING KEYS FROM A POSTAGE METERING APPARATUS TO A REMOTE DATA CENTER

(75) Inventors: Robert A Cordery, Danbury, CT (US); Frederick W. Ryan, Jr., Oxford, CT (US); Robert W. Sisson, Shelton, CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 09/220,515

(22) Filed: Dec. 24, 1998

(51) Int. Cl.[7] .............................................. G06F 17/60
(52) U.S. Cl. ........................ 705/60; 705/401; 705/405
(58) Field of Search .............................. 705/1, 405, 60, 705/401; 380/278

(56) References Cited

U.S. PATENT DOCUMENTS

| | | | | |
|---|---|---|---|---|
| 5,586,036 A | * | 12/1996 | Pintsov | 364/464.02 |
| 5,748,740 A | * | 5/1998 | Curry et al. | 380/25 |
| 5,764,772 A | * | 6/1998 | Kaufman et al. | 380/30 |
| 5,812,664 A | | 9/1998 | Bernobich et al. | 380/21 |
| 5,953,424 A | * | 9/1999 | Vogelesang et al. | 380/25 |
| 6,041,317 A | * | 3/2000 | Brookner | 705/61 |
| 6,219,669 B1 | * | 4/2001 | Haff et al. | 707/10 |

FOREIGN PATENT DOCUMENTS

| | | | |
|---|---|---|---|
| EP | 0 851 630 A2 | 7/1998 | H04L/9/32 |
| WO | WO-01/74005 A1 * | 10/2001 | H04L/9/08 |

OTHER PUBLICATIONS

Schneider, Processing a secure message on the Internet, Jun. 1997, Journal of Lending & Credit Risk Management, vol. 79 No. 10, pp. 58–63.*

Rubin, One–Time Pad Cryptography, Jan. 1997, http://www.contestcen.com/crypt005.htm, downloaded Aug. 2002.*

Wegman M N et al: "New Hash functions and their use in authentication and set equality", Journal of Computer and System Sciences, Jun. 1981, USA, vol. 22, NR. 3, pp. 265–279 XP008003418.

* cited by examiner

Primary Examiner—Joseph Thomas
Assistant Examiner—Christopher L. Gilligan
(74) Attorney, Agent, or Firm—Steven J. Shapiro; Angelo N. Chaclas

(57) ABSTRACT

A method for transmitting a key from a first device to a remotely located second device includes the steps of generating the key within the first device; selecting one of a plurality of one-time pad values from a one-time pad stored within the first device; creating a hash of at least the key and the selected one of the plurality of one-time pad values; and sending the hash and the key from the first device to the second device.

4 Claims, 3 Drawing Sheets

METHOD AND APPARATUS FOR SECURELY TRANSMITTING KEYS FROM A POSTAGE METERING APPARATUS TO A REMOTE DATA CENTER

FIELD OF THE INVENTION

The instant invention relates to value metering systems which utilize public key cryptography for printing verifiable indications of value, and more particularly, to value metering systems which periodically generate new public key pairs and securely provide the newly generated public key to a data center located remotely from the value metering system.

BACKGROUND OF THE INVENTION

The United States Postal Service (USPS) is currently advocating the implementation of a new Information-Based Indicia Program (IBIP) in connection with the printing of postage indicium by postage metering systems. Under this new program, each postage indicium that is printed will include cryptographically secured information in a barcode format together with human readable information such as the postage amount and the date of submission to the post office. The cryptographically secured information is generated using public key cryptography and allows a verification authority, such as the post office, to verify the authenticity of the printed postage indicium based on the information printed in the indicium and the printed destination address.

In at least one scenario, use of the public key cryptographic system for postage metering systems requires the generation within each individual metering device of a key pair consisting of a private key "V" and a corresponding public key "U". The private key V is used by the individual metering system to digitally sign the printed indicium and the digital signature is included as part of the bar coded portion of the indicium. Thus, when the verifying authority receives the indicium it verifies its authenticity in a known manner using the public key U which the verifying authority has previously received or which was sent to the verifying authority as part of the indicium. The receipt by the verifying authority of the public key is in the form of a certificate which includes, at a minimum, the public key U together with a digital signature of that public key using a private key of a trusted third party.

The USPS has recognized however, that the security of the public key system is based on the ability to prevent the compromise of the keys utilized. Accordingly, while the use of extremely large keys helps to ensure that the keys are not compromised by cryptoanalysis, the USPS has further proposed to increase security by requiring that the key pair used by each individual meter be changed on a periodic basis. Thus, each metering system will generate a new key pair to replace the existing key pair on a periodic basis. However, once a new public key U and private key V have been generated by the metering system, the new public key must be securely sent to a certificate authority so that a new public key certificate can be generated by the certificate authority and distributed back to the metering system or the verifying authority as appropriate. The USPS has proposed using the private key being replaced to sign the newly generated public key and sending the digitally signed newly generated public key to the certificate authority. The problem with this scenario is that if the private key being replaced has already been compromised, a fraudulent replacement public key can be sent to the certificate authority who will then issue a public key certificate based on the fraudulent public key. If this were to occur, postage Indicia could be printed with a standard computer without having any of the postage accounted for because the fraudulent Indicia will verify as being authentic at the verification facility.

Thus, what is needed is a method and apparatus which permits the secure transfer of newly generated public or private keys from a first device to a second device.

SUMMARY OF THE INVENTION

It is an object of the invention to provide a method of securely transmitting a key from one device to another. This object is met by providing a method for transmitting a key from a first device to a remotely located second device via the steps of generating the key within the first device; selecting one of a plurality of one-time pad values from a one-time pad stored within the first device; creating a hash of at least the key and the selected one of the plurality of one-time pad values; and sending the hash and the key from the first device to the second device.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

DETAILED DESCRIPTION OF THE PREFERRED EMBODIMENT

Figure 1:
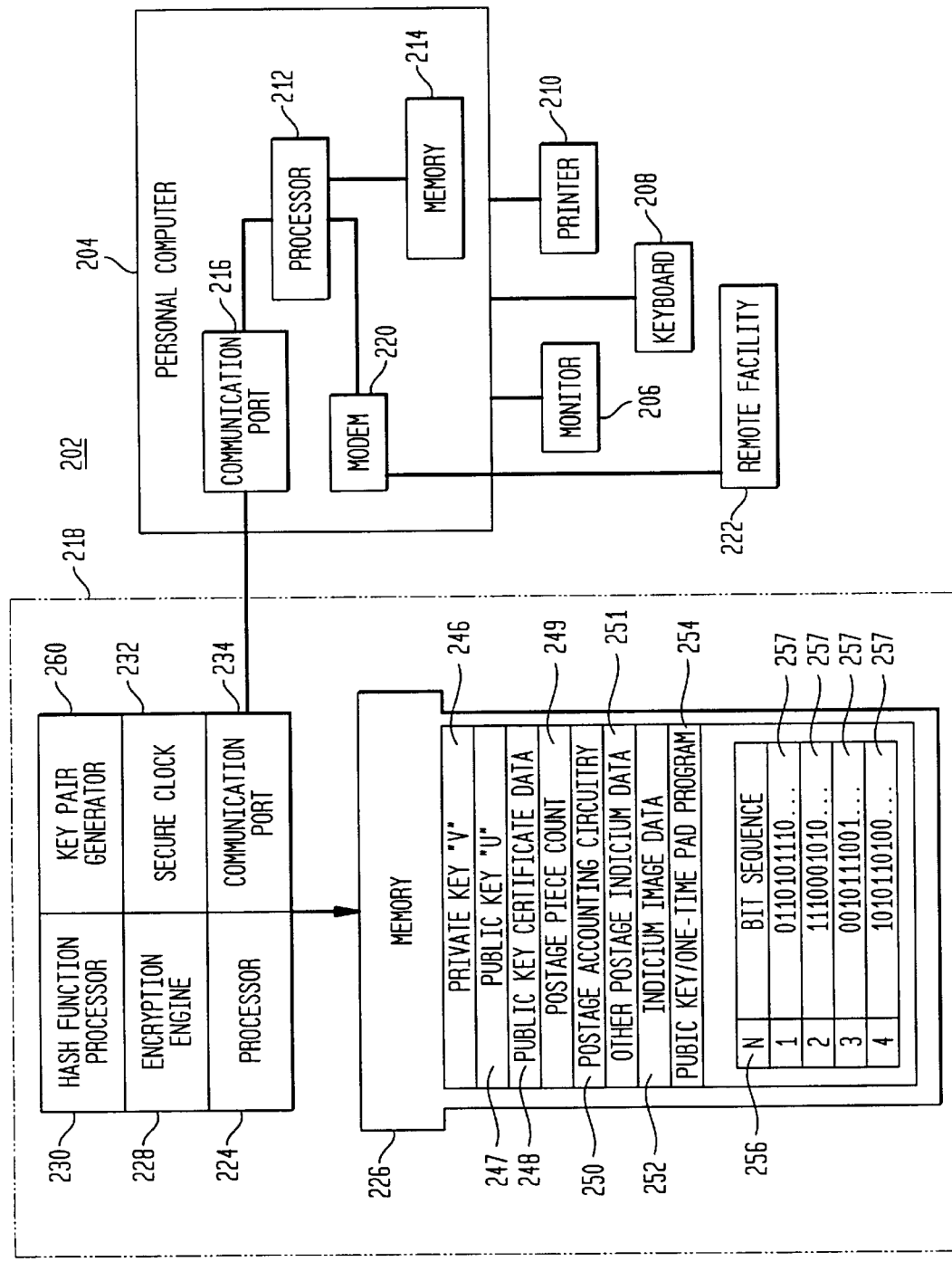
FIG. 1 is a schematic view of the inventive postage metering system.

Referring to FIG. 1, a postage metering system, shown generally at 202, includes a personal computer 204 connected to a monitor 206, a keyboard 208, and a printer 210. The personal computer 204 additionally includes a processing subsystem 212 having an associated memory 214. The processing subsystem 212 is connected to a communications port 216 for communication with a secure postage meter accounting subsystem 218 and a modem 220 for communicating with a remote facility 222 which is not part of the postage metering system 202. It should be recognized that many variations in the organization and structure of the personal computer 204 as well as the secure postage metering accounting subsystem 218 could be implemented. As an example, the communications from the modem 220 to the remote facility can be by way of hardwire, radio frequency, or other communications including the Internet. The postage metering accounting subsystem 218 may take many forms such as, for example, a secure vault type system, or a secure smart card system.

The postage metering accounting subsystem 218 includes a processor 224 coupled to a memory 226. The processor 224 has associated with it an encryption engine 228, a hash function processor 230, a secure clock 232 and a communications port 234. The memory 226 may have stored within it different data as well as the operating programs for the postage metering accounting subsystem 218. The data shown as stored in memory 226 includes a private key 246 of a specified length (i.e. 512, 1024, to 4096 bits), a corresponding public key 247, public key certificate data 248 (which could either be an actual public key certificate or a unique public key certificate identifier), an issued indicium piece count 249, conventional postage accounting ascending/descending register circuitry 250 which accounts for the amount of postage dispensed, other data 251 which may be included as part of the printed indicium (such as an algorithm identifier, customer identifier, and software identifier), indicium image data and associated programming 252 used to build the postage indicium image, and a public key/one-time pad program 254 which is used to securely send newly generated public keys from the postage metering accounting subsystem 218 to the remote facility 222. The accounting circuitry 250 can be conventional accounting circuitry which has the added benefit of being capable of being recharged with additional prepaid postage funds via communication with a remote data center.

Memory 226 further includes a one-time pad 256 of randomly generated one-time pad values 257 each having a respective pad entry value N associated therewith of which only pad entry values 1 through 4 are shown. Naturally the number of one-time pad values in the one-time pad 256 can be made as large as necessary to ensure a sufficient number of one-time pad values exist for the expected lifetime number of newly generated public keys by the postage metering accounting subsystem 218. The details and use of the one-time pad 256 are discussed in more detail further below.

Figure 2:
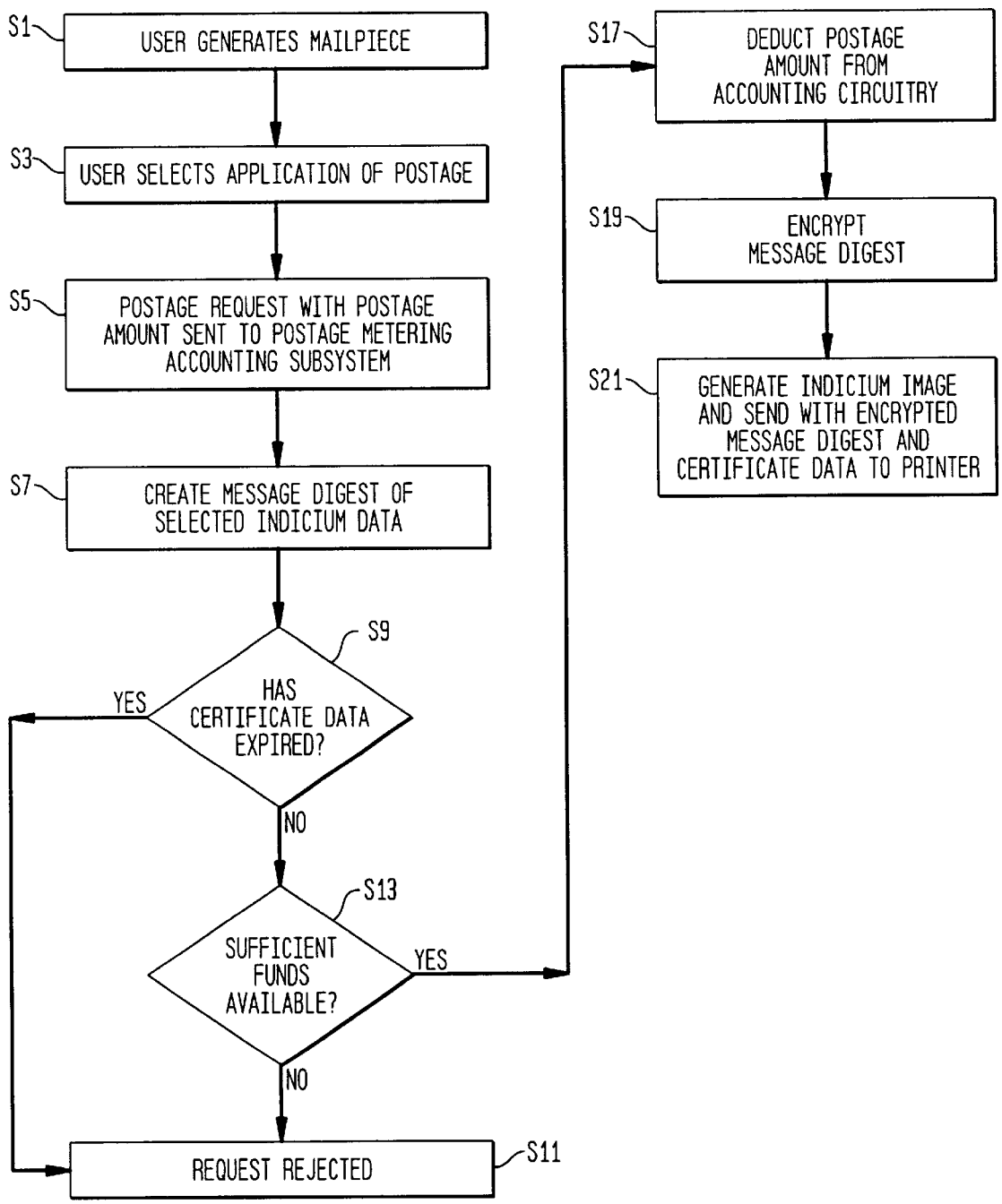
FIG. 2 is a flowchart showing the generation of a postage indicium within the postage metering system of FIG. 1.

Referring to FIG. 2, the operation of the postage metering system 202 will be explained in connection with generating and printing a postage indicium. At step S1, a user generates a mailpiece utilizing an application program stored in memory 214. Upon completion of the mailpiece the user can elect to have postage applied thereto by clicking on an icon appearing on monitor 206 or alternatively pressing a special function key of keyboard 208 (step S3). In either case, once the postage application option has been elected, the personal computer 204 sends such request together with the requested postage amount to the postage metering accounting subsystem 218 via the communication ports 216 and 234 (step S5). At step S7, the hash function processor 230 generates a message digest of selected data to be included as part of the indicium. The postage metering accounting subsystem 218 then checks the corresponding certificate data 252 to determine if it has expired (beyond validity date) (step S9). If the answer at step S9 is "YES", the request is rejected and the user notified of such rejection via the monitor 206 at step S11. If the answer at step S9 is "NO", the postage metering subsystem 218 determines if sufficient funds are available in the accounting circuitry 250 to pay for the requested postage (step S13). If the answer at step S13 is "NO" the request is rejected and the user is notified of such rejection via the monitor 206 (step S11). On the other hand, if the answer at step S13 is "YES" the amount of the postage to be dispensed is deducted within the accounting circuitry 250 (step S17). At step S19 the message digest is then encrypted utilizing the private key 246 and the encryption engine 228 (which contains the encryption algorithm). The indicium image is then generated using the indicium image data and program 252 and the indicium image including the encrypted message digest and the certificate data 252 are sent via the computer 204 to the printer 210 for printing on a mailpiece such as an envelope(step S21). The above description relative to the generation of the digitally signed postage indicium and operation of the postage metering system is known such that a further detailed discussion is not considered warranted.

Figure 3:
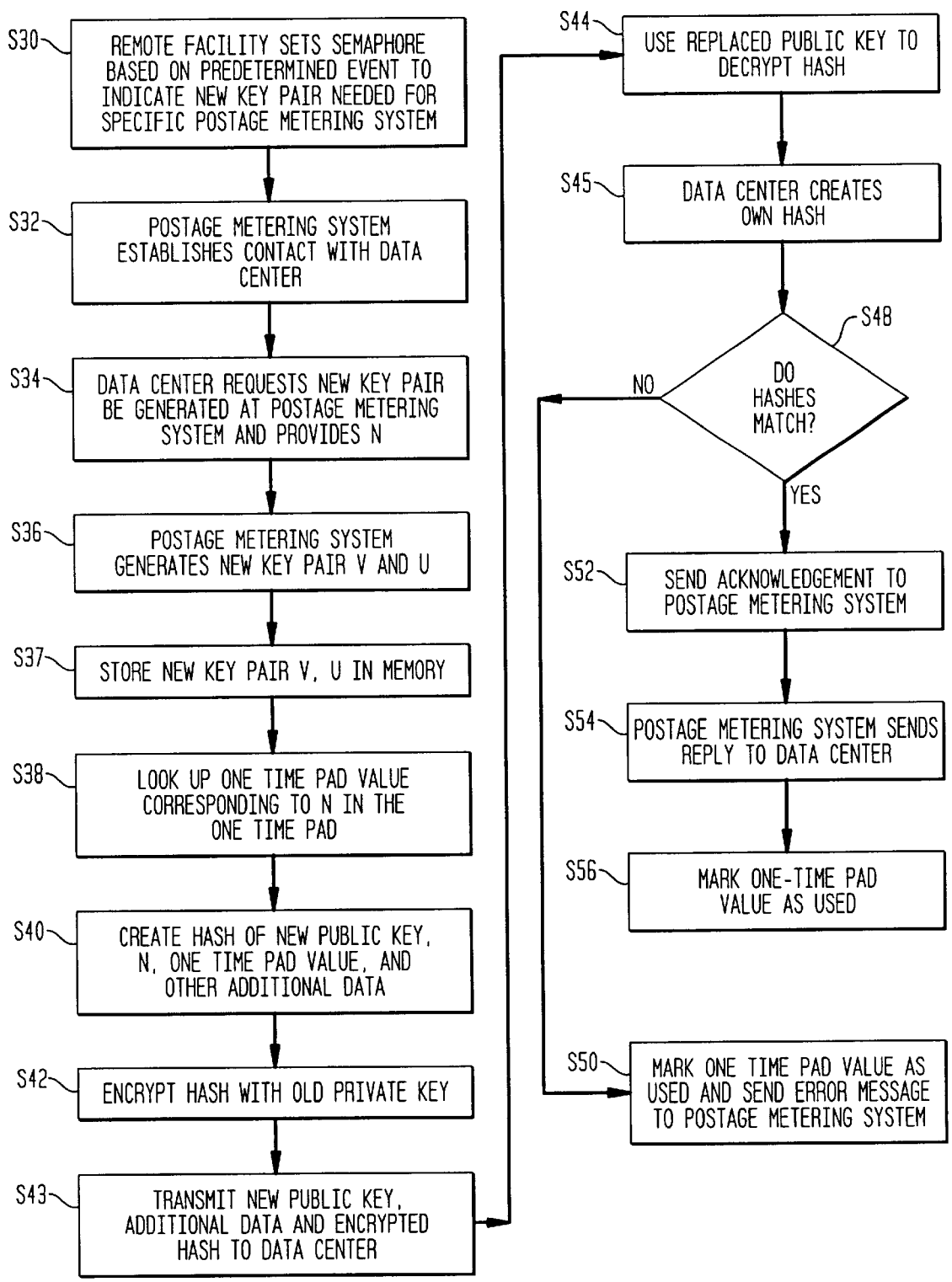
FIG. 3 is a flowchart of the process for securely sending a public key from the postage metering system to a data center.

As previously discussed, the private key 246 and the public key 247 must be changed on a periodic basis for security reasons. A new pair of keys is generated by the key pair generator 260 in a known manner upon the occurrence of a predetermined event such as after a fixed period of time or after a predetermined amount of postage has been dispensed or after a predetermined number of indicium have been printed. The process for generating the new key pair is shown in FIG. 3. At step S30, the remote facility 222 (i.e. a postal service data center) recognizes for a particular postage metering system 202 that the predetermined event has occurred and a semaphore is set at the data center 222 signifying such is the case. When the postage metering system 202 next establishes contact with the data center 222 through the modem 220 (step S32), such as for a postage funds refill or for a mandatory remote inspection, the set semaphore causes the data center 222 to request that the postage metering system 202 generate a new pair of keys (step S34). Moreover, along with the request, the data center 222 identifies the pad entry value N of the one-time pad 256 that the postage metering system 202 should use in returning the newly generated public key 247 to the data center 222. Upon receipt of the request for postage from the data center 222 the postage metering accounting subsystem 218 generates via the key pair generator 260 a new private key V and a new public key U at step S36. At step S37 the new public and private keys are respectively stored in memory locations 247 and 246. Moreover, the keys being replaced can also be stored for historical purposes or for continued use in the event that the below described communication with the data center 222 is not successfully completed. At step S38, the public key/one-time pad program 254 is used to look up the one-time pad value associated with the received pad entry value N in the one-time pad matrix 256. The one-time pad value 257 which is a randomly generated sequence of bits is then used by the hash function processor (or alternatively a different hash function processor) to create a hash (message digest) of the newly generated public key, the pad entry value N, the identified one-time pad value and any other additional data desired (step S40). For additional security, at step S42 the hash is encrypted with the replaced private key utilizing the encryption engine 228 (step S42). The postage metering system 202 then transmits the new public key, the additional data, and the encrypted hash to the data center 222 via the modem 220 (step S43).

The data center 222 also has the one-time pad 256, the hash function processor 230 and the to be replaced public key stored within its infrastructure of computerized data processing equipment. Thus, upon receipt of the new public key, the additional data, and the encrypted hash, the data center 222 verifies the authenticity of the received newly generated public key by using the replaced public key to decrypt the encrypted hash (step S44) and then creating its own hash based on the new public key, the additional data, and the pad entry value N and the one-time pad value associated therewith which is ascertained by looking it up in the one-time pad 256 stored at the data center 222 (step S45). The data center 222 compares its generated hash value to the received hash value (step S48) and, if they do not match, the data center 222 marks the one-time pad value as used and generates an error message to the postage metering system 202 stating that the newly received public key will be ignored (step S50). The postage metering system 202 user can then either attempt to repeat the process of generating a new key set or request assistance from the postal service. If however at step S48 the hash values match, the program proceeds to step S52 where the data center 222 sends an acknowledgement of receipt and acceptance of the newly generated public key. The acknowledgement can be in the form of a newly generated public key certificate signed with the private key of the data center 222. Upon receipt of the acknowledgement from the data center 222, the postage metering system 202 sends a reply that is received by the data center 222 and which confirms that the acknowledgement has been received at the postage metering system (step S54) thereby completing the successful transfer of the newly generated public key. At step S55 the data center 222 marks the one-time pad value as being used. Alternatively, the one-time pad value can be marked as being used prior to step S52.

One possessing ordinary skill in the art will recognize the increased security provided by the inventive system described above because of the fact that for each transfer of the public key to the data center 222 a randomly selected one-time pad value is used only once. Moreover, for further security if the result of the hash function is smaller than the one-time pad length, the result is that many different one-time pad values would result in the same hash. For example, if the resulting hash is 56 bits and the one-time pad value is 80 bits, on the average there are $2^{24}$ one-time pad values that give the same hash thereby making it very difficult to ascertain the actual one-time pad value used. In addition, for even further security, once the data center 222 has contacted and requested that a new key pair be generated (step S34) it can calculate the amount of time it takes for the postage metering device 202 to respond with the newly generated public key information. If a response is not received by the data center 222 within a predetermined period of time, the data center 222 marks the one-time pad value 257 as being used and generates an error message to the postage metering system 202 (step S50 ). The predetermined time period will depend on the size of the one-time pad values used and the amount of time required to complete steps S34 to S44. For example, if the one-time pad values 257 are 64 bits the predetermined time limit might be as short as 2 minutes. One skilled in the art will be capable of calculating the predetermined time periods taking into account the size of the one-time pad values, the required programming, and the speed of the processor 224. It is important to note that the time out feature just discussed is significant because it makes impractical the interception of the signed hash signal and the use of exhaustive searching techniques to determine the one-time pad value currently being used.

Additional embodiments can incorporate such features as locking out the postage metering system 202 once all of the one-time pad values 257 have been used, and using a special communication key instead of the old private key to encrypt the hash. Moreover, the postage metering subsystem 202 could initiate the new key generation process upon the occurrence of the predetermined event either at the next communication with the data center 222 or automatically if the modem 220 has an automatic dialing capability to the remote data center 222 and it is intended that the modem 220 be continuously connected to a phone line. Finally, while the above description is in connection with a postage metering system, it is applicable to any remote device where the periodic generation of new key pairs is required. For example, it could be used by a certificate authority for downloading public keys to a provider which provider generates public key pairs for use in specific remote devices.

Additional advantages and modifications will readily occur to those skilled in the art. Therefore, the invention in its broader aspects is not limited to the specific details and representative devices, shown and described herein. Accordingly, various modifications may be made without departing from the spirit or scope of the general inventive concept as defined by the appended claims. For example, while the hash is shown as being sent to the remote facility 222 via a modem, it can be delivered in any medium such as within a smart card, on a floppy diskette, or on a CD-ROM. Moreover, the process can also be applied to a secret key system where it is desirable to securely communicate a common secret (private key) between parties. In this scenario a secret key encryption standard such as DES is used to encrypt the newly generated private (secret key) utilizing the one-time pad value as the key input to the DES algorithm. The verification facility which has the same DES engine and the one-time pad values can then decrypt the encrypted secret key to remain in synchronization with the originating location of the newly generated private key.

What is claimed is:

1. A method for generating and transferring keys in a postage metering system comprising the steps of:
    (a) storing a one-time pad in a postage meter, the one-time pad including a plurality of one-time pad values;
    (b) generating cryptographically verifiable postage indicium in the postage meter using an original private key;
    (c) printing the cryptographically verifiable postage indicium on mailpieces;
    (d) determining that the original private key must be changed;
    (e) generating in the postage meter a first new private key and a first new public key;
    (f) selecting a first one of the plurality of one-time pad values;
    (g) creating a first hash of at least the selected first one of the plurality of one-time pad values and the first new public key;

(h) sending the first hash and the first new public key to a verification site;

(i) using the first new private key in lieu of the original private key for generating and printing the cryptographically verifiable postage indicium on mailpieces;

(j) determining that the first new private key must be changed;

(k) generating in the postage meter a second new private key and a second new public key;

(l) selecting a second one of the plurality of one-time pad values;

(m) creating a second hash of at least the selected second one of the plurality of one-time pad values and the second new public key;

(n) sending the second hash and the second new public key to the verification site; and (o) using the second new private key in lieu of the first new private key for generating and printing cryptographically verifiable postage indicium on mailpieces.

2. A method as recited in claim 1, further comprising: storing the one-time pad at the verification site; synchronizing the selecting of the first and second ones of the plurality of one-time pad values between the postage meter and the verification site thereby allowing the verification site to verify that the first and second new public keys received at the verification site were sent from the postage meter.

3. A method as recited in claim 2, wherein the first and second ones of the plurality of one-time pad values are used only one time.

4. A method as recited in claim 2, wherein in steps (d) and (j) the determining of the changing of the original private key and the first new private key is based on the respective use of the original private key and the first new private key in generating cryptographically verifiable indicium.

* * * * *